H. E. GRANT.
LIQUID SUPPLY SYSTEM.
APPLICATION FILED DEC. 4, 1907.

1,042,216.

Patented Oct. 22, 1912.

WITNESSES
W. W. Swartz
R. A. Balderson

INVENTOR
Horace E. Grant
by Bakewell, Byrnes & Parmelee
his attys.

UNITED STATES PATENT OFFICE.

HORACE E. GRANT, OF PITTSBURGH, PENNSYLVANIA.

LIQUID-SUPPLY SYSTEM.

1,042,216.  Specification of Letters Patent.  Patented Oct. 22, 1912.

Application filed December 4, 1907. Serial No. 405,048.

*To all whom it may concern:*

Be it known that I, HORACE E. GRANT, of Pittsburgh, Allegheny county, Pennsylvania, have invented a new and useful Liquid-Supply System, of which the following is a full, clear, and exact description; reference being had to the accompanying drawings, forming part of this specification, in which—

Figure 1:
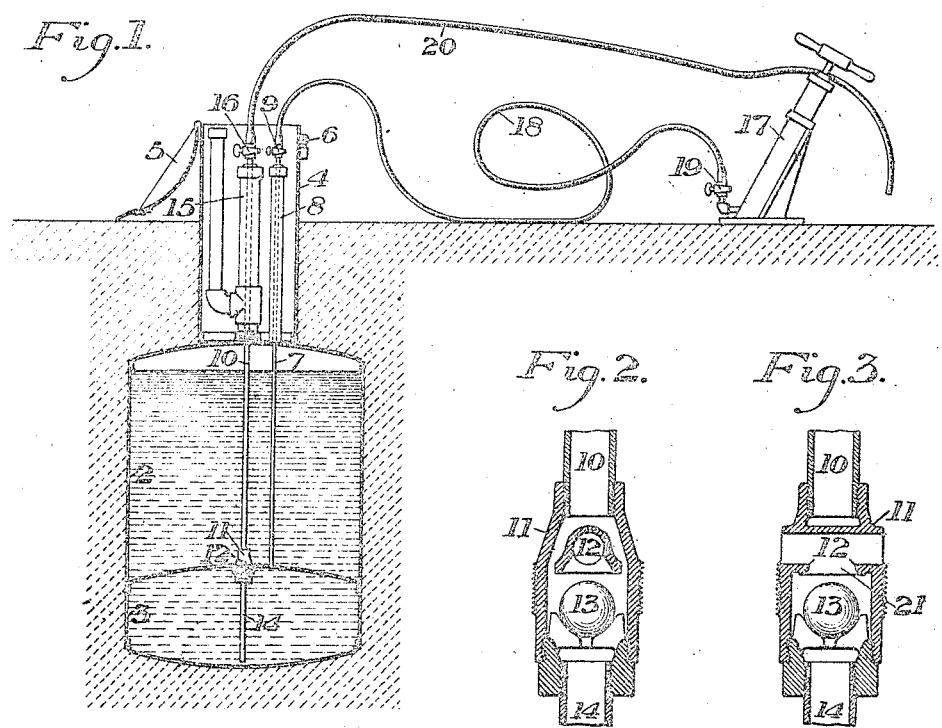
Figure 2:
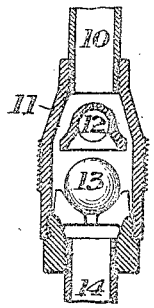
Figure 3:
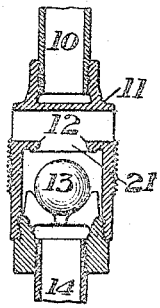
Figure 4:
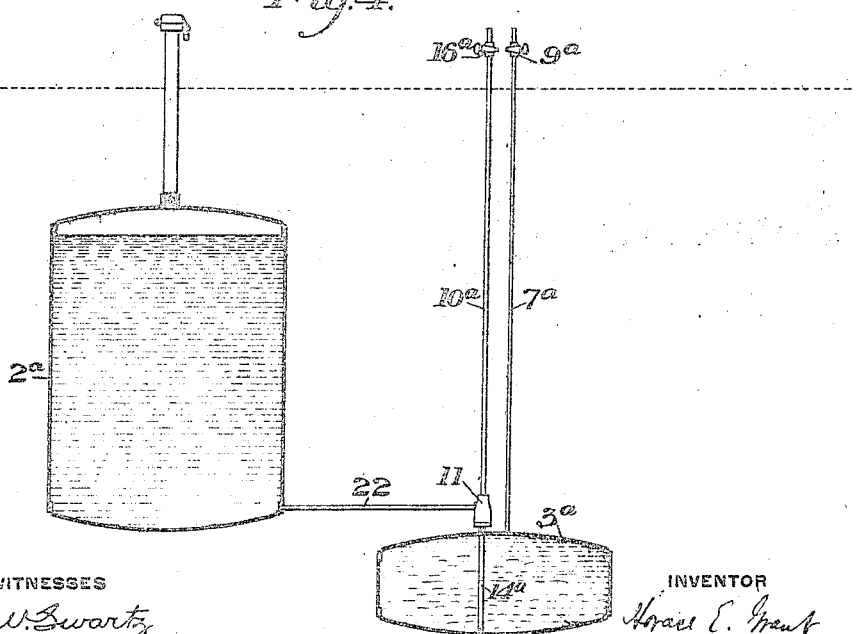

Figure 1 is a sectional side elevation showing one form of my improved gasolene supply system; Figs. 2 and 3 are detail views of the valve which I prefer to employ; and Fig. 4 is a view similar to Fig. 1 showing a modified form.

My invention relates to that class of gasolene or liquid supply tanks wherein the liquid is forced out under air pressure to the point of use.

The object of the invention is to obviate the difficulty of forcing out the gasolene after the tank has been emptied of the major quantity therein.

Heretofore after the gasolene tank was nearly emptied, or the gasolene was reduced to a small amount therein, it was necessary to raise the air pressure to a high amount in order to force out the liquid, and this consumed considerable time and labor.

My invention is designed to overcome this difficulty, and it consists in providing a supplemental tank into which the liquid is fed from the main tank by gravity, the air pressure entering this supplemental tank. The supplemental tank being small compared to the main tank, a small amount of air will force out the liquid at any time, and labor is greatly reduced.

In the drawings, referring to the form of Fig. 1, 2 represents the main tank, which is shown as buried in the ground, this tank having a supplemental tank 3 formed within its lower portion. I have shown the tank as provided with an upwardly projecting neck 4 having a cover 5, which may be locked in place as shown at 6. Within this neck, which projects above the ground level, extend the stationary air pipe 7, which projects from a casing 8 and downwardly into the supplemental reservoir 3. I have shown this pipe 7 as having a hand cock 9 within the neck of the tank. The gasolene outflow pipe 10 in this form extends downwardly into a valve casing 11 between the two reservoirs, and having the downwardly projecting pipe 14. This valve casing has a transverse hole 12, and contains a ball valve 13 which seats upwardly by pressure to close the passage 12 leading from the upper tank to the lower tank. I have shown the casing 15 as surrounding the gasolene outlet pipe, which pipe is also preferably provided with a cock 16. In the form shown I preferably employ a small hand pump 17 provided with a flexible pipe 18 extending from a two-way cock 19 thereon, and adapted to be connected to the air pipe for the reservoir. 20 is the hose which is connected to the gasolene outflow pipe to lead it to the tank on the vehicle or other receptacle to be filled.

In the use of the device, the pipes being attached, the operator forces air into the lower tank, which is kept full by the liquid flowing down through the valve by gravity. When the air pressure lifts the valve 13 it seats upwardly against the port 21, thus closing inlet from the main tank while the gasolene flows around the passage 12 and up through the outlet pipe. It will be noted that the outlet passage for the gasolene is directly past the valve 13, so that the liquid flowing outwardly through said passage tends to hold the valve 13 in a position to close the ports 12. This is an important feature of my invention, since the action described effectively prevents the fluttering of the check valve, a difficulty which is experienced where ordinary check valves are employed. The lower small reservoir being filled by gravity, and being comparatively small, a small amount of air will suffice to furnish the requisite amount of gasolene. When the desired amount has been obtained, the cocks may be shut and the pump may be dropped into the neck and locked therein by closing the lid, or the pump and pipes may be detached and the lid closed and locked.

In Fig. 4 I show another form of the apparatus, in which the supplemental tank 3ª is formed separately from the main tank 2ª and connected with it by a pipe 22 which leads into a valve casing 11 having a valve device similar to that shown in the form of Fig. 1. In this case 7ª is the air supply pipe, and 10ª the gasolene outflow pipe.

The advantages of my invention will be obvious to those skilled in the art.

The large amount of air pumping which is necessary to force out the latter portions of gasolene is avoided, and gasolene may be obtained at any time with small labor and time irrespective of the amount of gasolene in the main tank.

Many changes may be made in the form and arrangement of the tanks, the air supply system, &c., without departing from my invention.

I claim:—

In a storage supply system for inflammable liquids, a main tank, a supplemental tank, a gravity feed connection between the two tanks, a delivery pipe having a passage extending upwardly through the said feed connection, and a check valve for said connection interposed in said passage and exposed to the outflowing liquid therein, whereby the pressure of the outflowing liquid tends to hold the valve in position to close the communication between the two tanks, together with means for creating a pressure in the supplemental tank; substantially as described.

In testimony whereof I have hereunto set my hand.

HORACE E. GRANT.

Witnesses:
 GEO. B. BLEMING,
 JOHN MILLER.